Oct. 6, 1925.

L. M. ZEPP 1,556,308

WEIGHING MECHANISM

Original Filed March 10, 1923    5 Sheets-Sheet 2

Oct. 6, 1925.

L. M. ZEPP 1,556,308

WEIGHING MECHANISM

Original Filed March 10, 1923   5 Sheets-Sheet 5

Patented Oct. 6, 1925.

1,556,308

UNITED STATES PATENT OFFICE.

LEVIGNE M. ZEPP, OF BALTIMORE, MARYLAND.

WEIGHING MECHANISM.

Original application filed March 10, 1923, Serial No. 624,087. Divided and this application filed January 24, 1924. Serial No. 688,154.

*To all whom it may concern:*

Be it known that I, LEVIGNE M. ZEPP, a citizen of the United States of America, residing in the city of Baltimore, State of Maryland, have invented certain new and useful Improvements in Weighing Mechanism, of which the following is a specification.

This application is a division of my co-pending application No. 624,087, filed March 10, 1923, entitled mixing machine. The machine illustrated in the co-pending application is particularly adapted for hydrating lime, though it is capable of more general application. The entire operation of the machine is automatic, and it comprises mechanism for feeding, measuring, mixing for a predetermined period, and dumping.

The portion of the machine described and claimed herein is disclosed in the co-pending application, as the means for feeding and measuring the lime or other material preferably dry material being fed to the mixer.

As shown, the inlet valve or feed gates are opened by the timing mechanism of the machine and tripped or closed by the weighing mechanism. In other words, when the hopper is full and ready to dump, the feed of material to the hopper is discontinued. The weighing device or hopper in turn discharges into the mixer whenever its contents has accumulated to the extent of the desired charge. In order to make the disclosure complete and the weighing mechanism entirely automatic, I have shown in addition to the weighing mechanism proper the connections whereby the feed gates are opened by the timing mechanism from the mixer.

In the drawings—

Figures 2, 3:
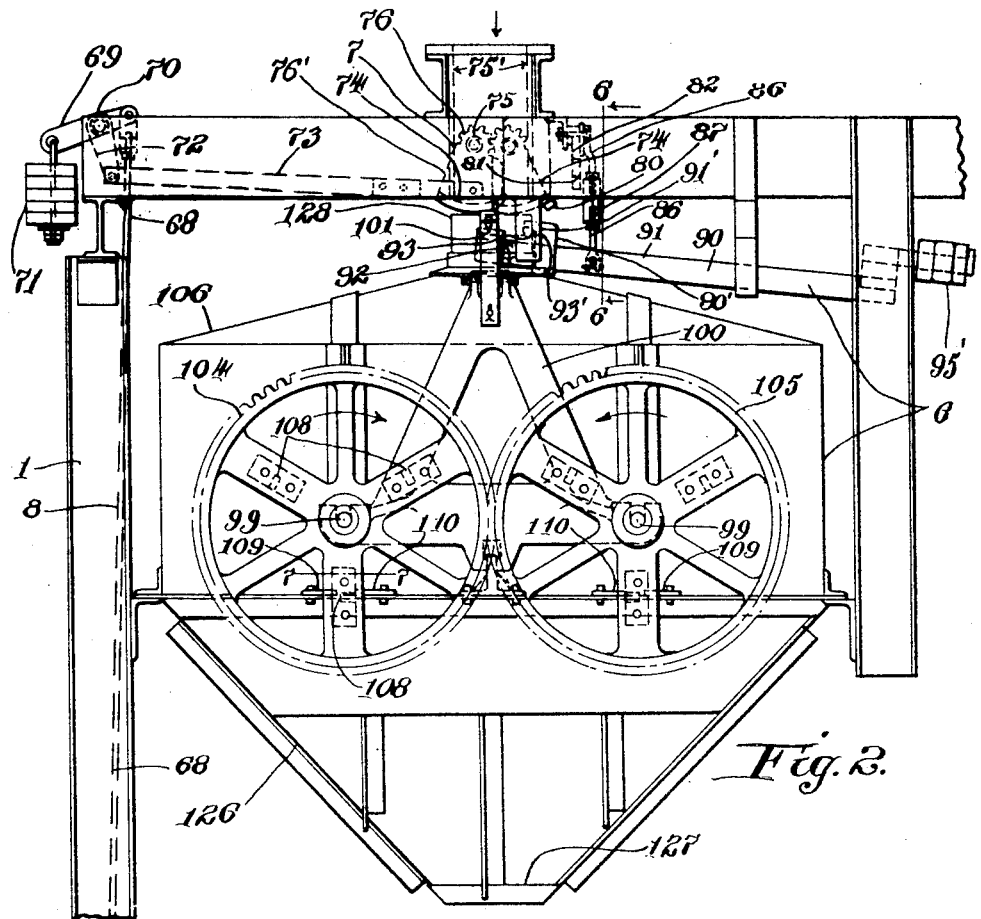
Figure 2 is an elevation taken from the right in Figure 1, showing the weighing and feeding mechanism proper.
Figure 3 is a section on the line 3, 3 of Figure 1 and parallel to the plane of Figure 2, showing the hopper of the weighing mechanism.
Figure 6:
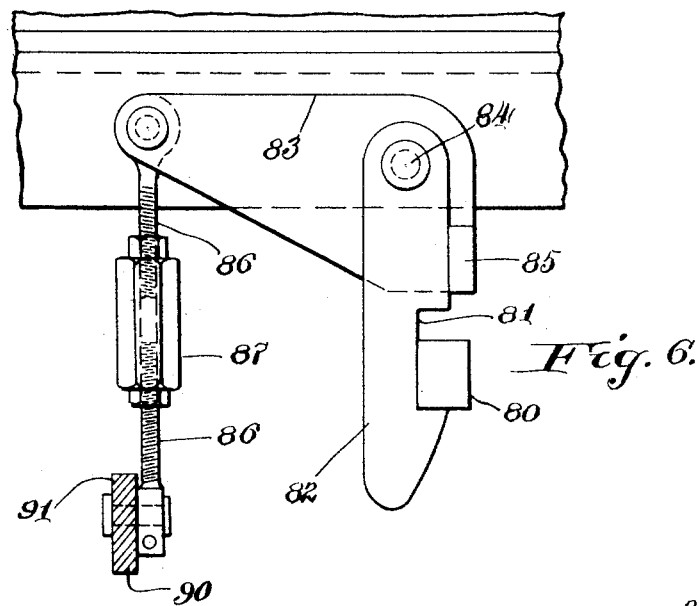
Figure 7:
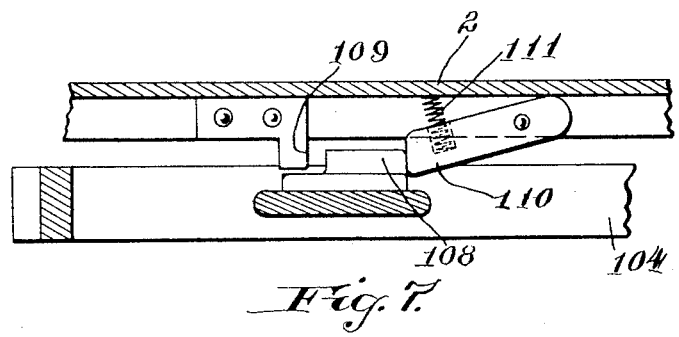

Figure 6 is a detail of the gate locking mechanism, the same being in the nature of a section through the scale beam 90 on the plane 6, 6 of Figure 2 looking in the direction of the arrow; and Figure 7 is a horizontal section on the line 7, 7 of Figure 2.

Referring to the drawings by numerals, each of which is used to indicate the same or corresponding parts in the different figures, the machine as shown comprises a frame 1, a mixer drum 2 mounted thereon to rotate about a vertical axis, a stationary cover 3 therefor, a weighing mechanism 6, a feeding mechanism 7 with actuating or tripping means 8 for the feeding mechanism. The mixing drum is driven from any suitable source of power by means of a pulley 10 by way of suitable gearing including a beveled pinion 14 which meshes with a beveled ring gear 16 on the bottom of the drum. The timing or tripping mechanism for the feed includes an upright cam shaft 39 which is driven from the drum by a beveled gear 48 which meshes with the ring gear 16 on the drum, the beveled gear 48 being in turn secured to a shaft 49 mounted in suitable bearings on the frame and carrying a worm 51 which meshes with a worm gear 52 secured to the cam shaft, all of which mechanism is illustrated in Figure 1.

Figure 1:
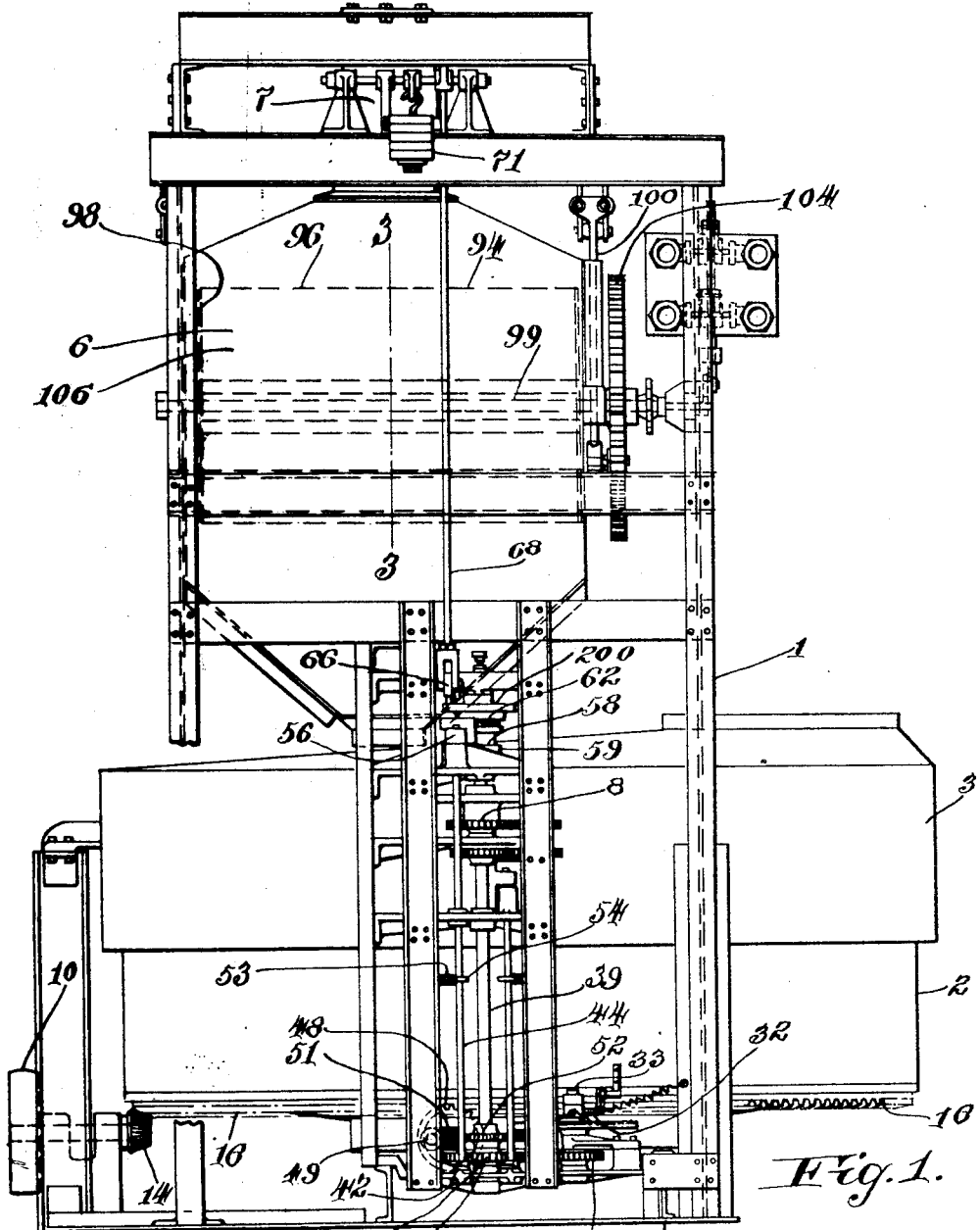
Figure 1 is a side elevation illustrating the weighing mechanism, an external view of the mixing mechanism being included.
Figure 5:
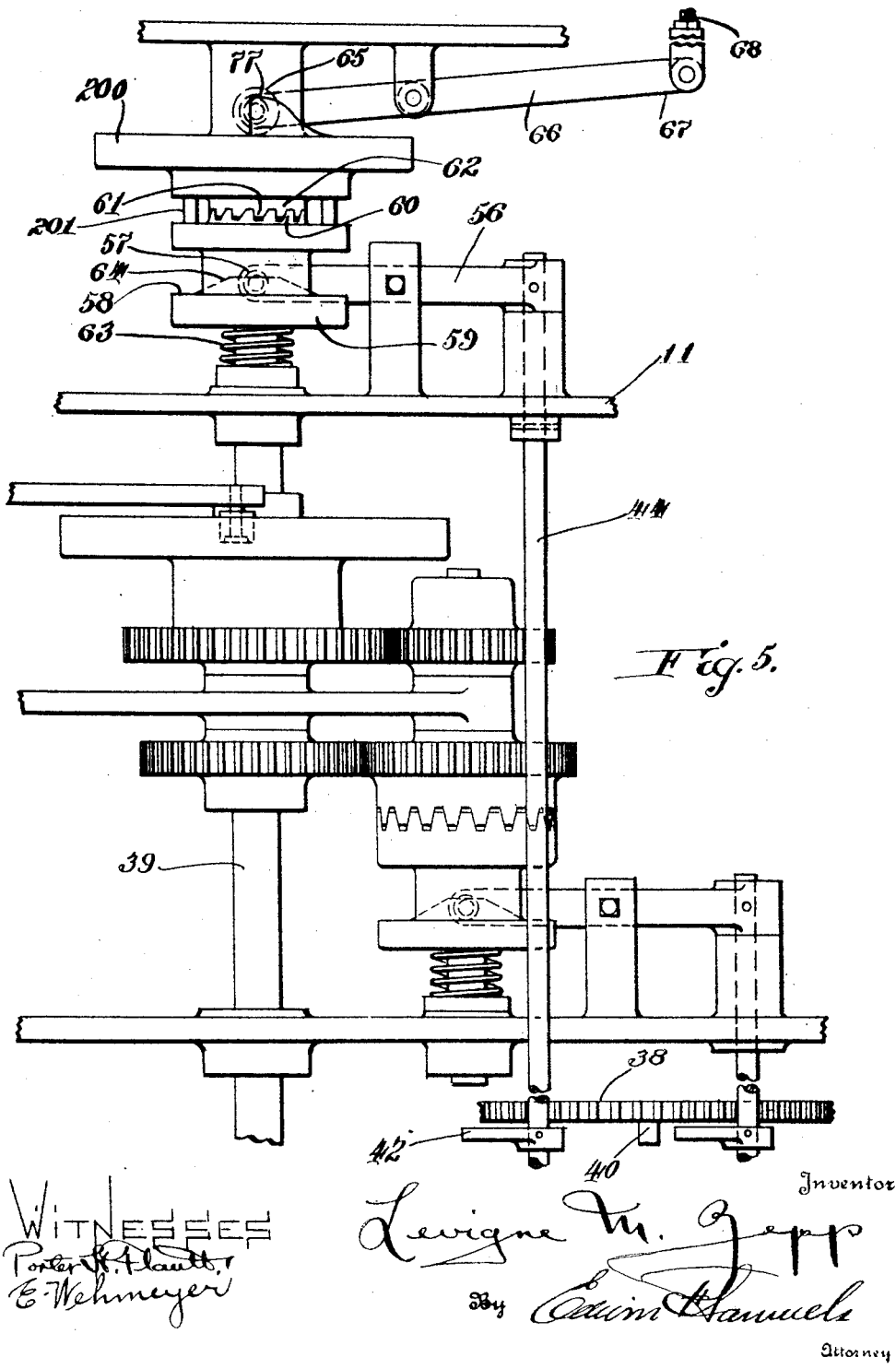
Figure 5 is an elevation of the tripping mechanism which is also diagrammatic in the sense that some of the parts are slightly distorted to bring them into the plane of the figure.

Referring now to Figures 1 and 5, I have shown an upright shaft 44 mounted to oscillate in suitable bearings in the frame. This shaft is oscillated through a slight arc by contact of a dog 40 on the toothed gear 38 with an arm 42 projecting from the shaft, see Figure 5, the said shaft 44 being returned to normal position by means of a spring 53, Figure 1, engaging an arm 54 on the shaft, the spring being secured at its opposite extremity to the machine frame. The gear 38 is in turn driven by the gear 37, see Figure 1, secured to the shaft 33 which is in turn driven step by step by the ratchet and pawl mechanism 32 from the mixing drum, one step to each revolution of the drum.

This shaft 44 extends upward parallel to the cam shaft 39 and carries a cam follower 57 mounted on a cam follower arm 56, which arm is rigidly connected to the shaft 44. As shown, it is placed at right angles to the shaft 44, the follower 57 normally engaging the face or path 58 of a cam 59 which slides and rotates on and relatively to the cam shaft 39. Normally the follower is in engagement with the high point or hump 64 of the cam surface or path 58 of the cam 59. The oscillation of the shaft 44, however, throws the follower 57 entirely out of engagement with the cam 58 and permits it to move upward in response to the pressure of spring 63.

Figure 4:
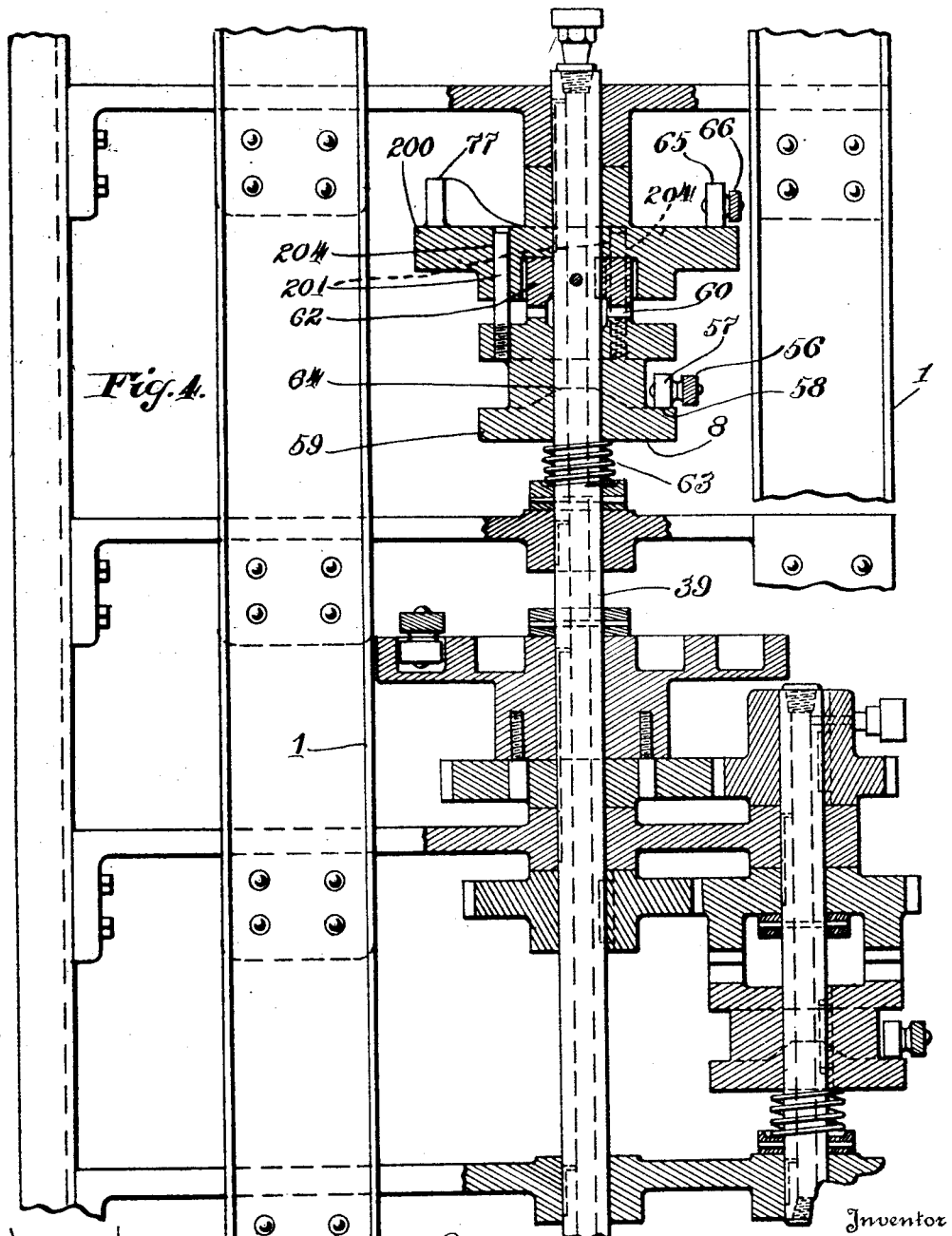
Figure 4 is a view showing the timing or feed gate tripping mechanism in section and more or less diagrammatically, the parts being slightly distorted for convenience of illustration.

It will be noted by reference to Figure 4 that the parts 59 and 62 compose a jaw clutch, the member 62 being pinned to the shaft 39 so that it rotates therewith, and when the clutch is in engagement, the cam 59 rotates with the shaft, carrying with it the cam 200 which is otherwise stationary. Normally the follower 57 holds the cam 59 which is provided at its upper surface with clutch teeth 60 in the low position, the follower 57 being, as aforesaid, normally in contact with the high point 64 of the cam. The clutch teeth 60 are shaped and arranged to co-operate with the clutch teeth 61 on the collar 62, which, as aforesaid, is secured to the shaft and which therefore rotates constantly. The cam member 200 is mounted on the shaft 39 to rotate freely relatively thereto and is connected to the cam 59 by pins 201. These pins are secured to the cam member 59 and engage holes 204 in the cam member 200, being free to slide therein in the direction of the shaft and connecting the members 59 and 200, so that they rotate together with the collar 62 and the shaft 39, when the teeth 60, 61 are engaged and remain stationary when the teeth are out of engagement. Therefore, the oscillation of the tripping shaft 44 in response to the action of the dog 40, throwing the follower 57 out of engagement with the path 58, releases the cam clutch member 59, permitting it to move upward in response to the pressure of the spring 63, and this motion causes the teeth 60 and 61 to mesh, rotating the members 59 and 200 through one turn, the tripper shaft 40 being immediately released, on the escape of the dog 40 from the arm 42, swings backward in response to the action of the spring 53, causing the follower 57 to engage the path 58, and when the rotation of the parts brings this follower into engagement with the high part 64 of the cam 59, the cam clutch member 59 is depressed, releasing the clutch teeth and permitting the cam clutch member 59 and the cam 200 to stop.

During the rotation of the cam 200 it engages and actuates a follower 65 which is mounted on the end of an intermediately pivoted lever 66, see Figure 5, the swinging end 67 of which is pivotally connected to the lower end of a connecting rod 68 which extends upward to the top of the machine, where it is connected to the gate or feed mechanism 7, see Figure 2. The connecting rod 68 is pivotally connected at its upper end to one end of a lever 69, which is intermediately pivoted at 70 on the frame of the machine and weighted at 71 as to its other end. This lever 69 is provided intermediately with a depending arm 72, so that the entire lever 69 with the arm 72 is in the nature of a double bell crank lever. The lower end of the arm 72 is pivotally connected to a thrust rod 73 which is in turn pivotally connected at its opposite end to one of two arcuate gates 74 controlling the inlet or supply passage 75', which gates are suspended from studs 75 by suitable segmental brackets 76', each said bracket being formed integral with one of two toothed segments 76 which are pivoted on the said respective studs 75 and the teeth of which intermesh, so that the gates 74 move in opposite directions simultaneously.

It is apparent from the structure described, particularly the sharp nose 77 of the cam 200, that the application of tension to the rod 68 is momentary, the tension being immediately released, so that the weight 71 tends to close the gates 74 by the action of the weights through the latter connection 69, 70, 72 and the connecting rod 73. The gates are, however, held in open position by the trigger action illustrated, particularly in Figure 6 and shown on small scale in the upper central portion of Figure 2, a little to the right.

Either the right or lefthand gate, in the illustration the righthand gate, is provided with a lug 80 which enters the notch 81 in a freely swinging depending trigger member 82, which hangs from any suitable support on the frame. The trigger 82 serves to hold the gates open until the desired charge is delivered to the hopper and is tripped by the weighing apparatus when the delivery of this charge to the hopper is completed. Tripping is accomplished by the lever 83 see Figure 6, pivoted at 84, which in this instance is the pivot from which the trigger swings, and said lever 83 has a finger 85 which engages the trigger 82 from the side on which it is engaged by the lug 80 on the gate, i. e., on the side on which the slot 81 is open. The tripping lever 83 extends backward from the pivot 84 on the side thereof opposite the finger 85, and is pivotally connected at its end to a connecting rod 86, which, as shown, is adjustable by means of a turn buckle 87 and which is pivotally connected at its lower end to the scale beam 90 which supports the hopper.

The scale beam carries a downwardly-disposed knife edge 93 on an L-shaped bracket 90', which knife edge 93 rests on a suitable bearing block 93' supported on the machine frame by means of a bracket 91'. It is apparent from the illustration that the long arm 91 of the scale beam to which the connecting rod 86 is connected at its lower end, rises when the full load is introduced into the hopper, and that the upward thrust thus applied to the connecting rod 86 will swing the lever 83 in right-handed rotation about the pivot 84, pressing the finger 85 against the trigger 82, releasing the lug 80 and permitting the gates to close in response to the pressure of the weight 71.

Thus the material being weighed is admitted automatically into the hopper in response to the action of the tripping mechanism 8 and is cut off by the action of the weighing mechanism when the predetermined load has been placed in the hopper, the extent of the said load being determined by weights 95' on the beam at the right in Figure 2.

The weighing hopper as shown consists of a pair of rotary paddle wheels suspended from the short arm 92 of the scale beam 91 as by brackets 100 outside the hopper casing. These paddle wheels 94, 95 are provided each with three veins or paddles 96 separated by arcs of 120° and radiating from the respective centres of the said wheels. The paddles are otherwise referred to herein as radiating members. It may be noted that each wheel includes a pair of discs 98, 98', Figure 3, spaced apart and concentric with the respective shafts 99 to which they are secured, which shafts are mounted in the bracket 100 which is suspended from the scale beam by means of a knife edge 101. The paddles 96 connecting the discs 98, 98' of each pair, and the discs which have their axes parallel, are spaced apart slightly from a position of contact or tangency, the paddles extending lightly beyond the discs so that they overlap at 102 as shown in Figure 3. The term paddle wheel as used hereinafter does not necessarily designate a member which contains all the details just described. The shafts 99 are connected so that they rotate simultaneously and oppositely by means of toothed gears 104 and 105 of the same diameter and secured to the respective shafts 99 and intermeshing. The hopper receptacle is formed by the respective blades or paddles 96 of the two paddle wheels, two corresponding blades of each paddle wheel being in contact in a horizontal plane and overlapping at 102 as illustrated in Figure 3, the overlapping blades or paddles forming the bottom, while two others, one on each wheel, extend upward from the horizontal plane at an angle of 60°, forming two sides of the receptacle as shown in Figure 3, the other two sides being formed by the sides of the hopper casing 106, the discs 98 being close up against the sides of the casing and the gears 104 and 105 being outside the casing as shown in Figures 1 and 2.

The respective gears 104, 105, the shafts 99 and the paddle wheels forming the hopper, are locked in closed position, illustrated in Figure 3 and described, during each weighing operation by means of lugs 108, three of which are shown on each gear on the respective alternate spokes and spaced by arcs of 120°, and corresponding each to a closed position of the hopper. These lugs 108 cooperate with the stationary lugs 109 on the frame, engaging them in the weighing or upper position of the hopper, as illustrated in Figure 2.

In the operation of the hopper, as illustrated, the arrangement of the lugs 8, 9 and 10 is illustrated in Figure 7, which is a horizontal section on the line 7, 7 of Figure 2. In the operation of the hopper as illustrated, the paddles rotate oppositely, but each rotates in but a single direction through an arc of 120° at each dumping operation, and as each paddle wheel comes around to closed position, the scale beam having risen as soon as the material is dumped, a lug 108 on each wheel encounters the corresponding lug 109 on the frame, and before reaching this position each lug 108 passes a corresponding yielding pivoted spring catch 110, see Figure 7, which swings out of the way in response to the pressure of the lug 108 and then returns to position behind this lug, being actuated by a coiled spring 111 or any other suitable means. The lugs serve to keep the hopper closed during filling. When the charge is completed and the hopper drops due to the swinging of the scale beam, the lugs 108 pass out of alignment with the lugs 109 and 110 on the frame, permitting the paddles to rotate in accordance with the arrows in Figure 2 and in response to the weight of the material in the hopper, dumping the material.

It will be noted that the casing 106 completely encloses the hopper, and that it includes a funnel 126 with an outlet opening 127 over the centre of the mixing drum, and that it also includes an inlet passage 128 leading downward from the gates 127.

It is easily apparent from the foregoing description that the feeding mechanism 7 is controlled or opened by the timing or tripping mechanism 8 and locked in open position by trigger 82, and that the locking mechanism is released by the action of the hopper as it moves downward in response to the weight of the full charge of material predetermined by the fixing of the weights 95' on the scale beam, which unlocking permits the gates to close, so that the supply of material is cut off, and that the hopper is in turn locked in closed position during filling and is moved from locking position and permitted to open and dump, when it receives a full charge and moves downward due to the tipping of the scale beam.

I have thus described specifically and in detail a single embodiment of my invention in order that the nature and operation of the same may be clearly understood; however, the specific terms herein are used descriptively rather than in a limiting sense, the scope of the invention being defined in the claims.

What I claim and desire to secure by Letters Patent is:

1. A weighing hopper consisting of a plurality of radiating members, means mounting said members for rotation about spaced axes, weighing means supporting said members, means for locking them in co-operating position in which they form a receptacle to hold the material to be weighed, said locking means being placed to engage the radiating member in the empty position of the weighing device so that the said members are released from the locking means by passing out of engagement therewith, as the weighing operation is completed by filling of the hopper to the predetermined extent, the radiating members being caused to rotate and release the material weighed.

2. A weighing device comprising a receptacle, a swinging member forming a portion of the bottom of said receptacle, yielding means supporting said receptacle and yielding at a predetermined load in the receptacle to accomplish weighing, means for locking the swinging member to close the bottom of the receptacle at the upper or weighing position of said receptacle, means supporting part of said locking means separately from the receptacle whereby the downward motion of the receptacle as weighing is completed, releases said locking means and said swinging member opening the bottom of the receptacle and discharging the material weighed.

3. Feeding and weighing mechanism comprising a weighing receptacle, means for leading material to the receptacle, a gate controlling said supply, means for opening and closing the bottom of said receptacle, means for locking said latter means in closed position, yielding means supporting the receptacle adjusted to yield on the placing of a predetermined load in the receptacle to weigh said load, means supporting a part of said locking means separately from the receptacle in co-operation therewith at the empty or upper position of the receptacle so that the locking and hence the closing means for the receptacle are released as the receptacle drops when weighing is completed releasing the weighed material, means for holding the gate in open position during loading and means connected to the weighing mechanism controlling the closing operation of said gate.

4. Feeding and weighing mechanism comprising a weighing receptacle, means for leading material to the receptacle, a gate controlling said means, means for opening and closing the bottom of said receptacle, means for locking said latter means in closed position, yielding means supporting the receptacle adjusted to yield on the placing of a predetermined load in the receptacle to weigh said load, means supporting a part of said locking means separately from the receptacle in co-operation therewith at the empty or upper position of the receptacle only, another part of said lock being mounted to move with the receptacle so that the locking and hence the closing means for the receptacle are released as the receptacle drops when weighing is completed releasing the weighed material, means tending to close the feed gate, means for supporting the feed gate in open position and means actuated by the weighing mechanism for releasing the gate and permitting it to close when the weighing receptacle drops.

5. A weighing device comprising a receptacle consisting of a plurality of paddle wheels having radiating blades, substantially parallel shafts supporting said paddle wheels, means moving with the receptacle for locking the paddle wheels with one blade of each paddle wheel substantially in horizontal position to form the bottom of a receptacle, weighing means supporting the receptacle which is free to move to accomplish weighing, means co-operating with the lock and means supporting same separately from the receptacle serving to release the lock when the receptacle descends during weighing releasing the paddle wheels and providing for discharge of the material at the end of the weighing operation.

6. A weighing device comprising a receptacle including a plurality of paddle wheels having radiating blades, substantially parallel shafts supporting said paddle wheels, means moving with the receptacle for locking the paddle wheels with one blade of each paddle wheel substantially in horizontal position to form the bottom of a receptacle, weighing means supporting the receptacle which is free to move to accomplish weighing, means co-operating with the lock and means supporting same separately from the receptacle serving to release the lock when the receptacle descends during weighing releasing the paddle wheels and providing for discharge of the material at the end of the weighing operation, means for leading material to the receptacle and means for automatically cutting off the material, means for holding said cutting off means in open position and means connected to the weighing device controlling said cut off to stop the flow of material at the end of the weighing operation.

7. A weighing hopper comprising rotary paddle wheels, means connecting the rotary paddle wheels together to move oppositely and simultaneously, weighing mechanism supporting the hopper and permitting it to move downward when filled to the desired extent, and means for locking the paddle wheels in the upper position of the hopper, means supporting a part of said locking mechanism separately from the hopper whereby the lock is released as the hopper moves downward in the weighing operation when the charge is completed.

Signed by me at Baltimore, Maryland, this 21st day of January, 1924.

LEVIGNE M. ZEPP.